US012493481B2

(12) United States Patent
Pfefferle et al.

(10) Patent No.: US 12,493,481 B2
(45) Date of Patent: Dec. 9, 2025

(54) LIVE MIGRATION BETWEEN HOSTS OF A VIRTUAL MACHINE CONNECTION TO A HOST INTERFACE

(71) Applicant: INTERNATIONAL BUSINESS MACHINES CORPORATION, Armonk, NY (US)

(72) Inventors: Jonas Alexander Pfefferle, Rueschlikon (CH); Nikolas Ioannou, Zurich (CH); Jose Gabriel Castanos, Yorktown Heights, NY (US); Danny Harnik, Tel Aviv (IL); Gautam H. Shah, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 17/529,891

(22) Filed: Nov. 18, 2021

(65) Prior Publication Data
US 2023/0153140 A1 May 18, 2023

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01);
(Continued)

(58) Field of Classification Search
CPC .................................................. G06F 9/45558
(Continued)

(56) References Cited

U.S. PATENT DOCUMENTS 11,169,835 B1 * 11/2021 Duong ................. G06F 9/4856
2008/0222375 A1 * 9/2008 Kotsovinos ........... G06F 3/0617
709/230
(Continued)

FOREIGN PATENT DOCUMENTS

WO 2023/089387 A1 5/2023

OTHER PUBLICATIONS

Michael Nelson et al., Fast Transparent Migration for Virtual Machines, ATEC '05, Apr. 10, 2005.
(Continued)

*Primary Examiner* — Mehran Kamran
(74) *Attorney, Agent, or Firm* — CHIP LAW GROUP

(57) ABSTRACT

Live migration of a virtual machine (VM) includes establishing multipath connections between the VM and functions of host interface on a source host. The multipath connections include a passthrough path and a software-virtualized (or emulated) path provided by a hypervisor of the source host. A failover of the passthrough path to the emulated path is executed, and a state of the emulated path is thereafter saved. On a host interface of a destination host, functions corresponding to those of the source host are exposed. The VM is then migrated from the source host to the destination host. The VM resumes host interface communication with the host interface of the destination host from the saved state via an emulated path provided by a hypervisor of the destination host. After resuming communication, a passthrough path of communication between the VM and the host interface of the destination host is established.

17 Claims, 10 Drawing Sheets

(52) U.S. Cl.
CPC .............. *G06F 2009/45579* (2013.01); *G06F 2009/45595* (2013.01)

(58) Field of Classification Search
USPC ........................................................... 718/1
See application file for complete search history.

(56) References Cited

U.S. PATENT DOCUMENTS

| | | | | |
|---|---|---|---|---|
| 2012/0017031 | A1* | 1/2012 | Mashtizadeh | G06F 9/4856 711/6 |
| 2012/0042034 | A1* | 2/2012 | Goggin | G06F 3/0647 709/216 |
| 2013/0305246 | A1* | 11/2013 | Goggin | H04L 47/783 718/1 |
| 2014/0229697 | A1* | 8/2014 | Colbert | G06F 3/0664 711/162 |
| 2015/0220354 | A1* | 8/2015 | Nair | C07K 16/2887 710/308 |
| 2015/0242227 | A1* | 8/2015 | Nair | G06F 9/45541 718/1 |
| 2015/0317177 | A1* | 11/2015 | Hussain | H04L 67/1097 718/1 |
| 2018/0139101 | A1* | 5/2018 | Puri | H04L 41/12 |
| 2018/0157561 | A1* | 6/2018 | Venkatesh | G06F 9/45558 |
| 2018/0349161 | A1* | 12/2018 | Jain | G06F 9/45537 |
| 2019/0065096 | A1* | 2/2019 | Sterin | G06F 9/45558 |
| 2019/0163521 | A1* | 5/2019 | Lee | G06F 9/4856 |
| 2019/0377594 | A1* | 12/2019 | Xie | G06F 9/45558 |
| 2020/0150997 | A1* | 5/2020 | Chang | G06F 9/45558 |
| 2020/0167181 | A1* | 5/2020 | Tsirkin | G06F 13/4027 |
| 2020/0167247 | A1* | 5/2020 | Tsirkin | G06F 11/1484 |
| 2021/0165675 | A1* | 6/2021 | Wang | G06F 9/45558 |
| 2021/0232468 | A1* | 7/2021 | Tidke | G06F 3/0619 |
| 2022/0334989 | A1* | 10/2022 | Bar-Ilan | G06F 9/45558 |
| 2023/0153140 | A1* | 5/2023 | Pfefferle | G06F 9/45558 718/1 |

OTHER PUBLICATIONS

Live migration, Last updated Jul. 8, 2021 https://cloud.google.com/compute/docs/instances/live-migration.
Configuring Device Mapper Multipath, Red Hat Enterprise Linux, Copyright 2021.
PCT International Search Authority, International Search Report and Written Opinion, Nov. 28, 2022, 7 pages.
"QEMU—the FAST! processor emulator", retrieved from web https://web.archive.org/web/20210811221752/https://www.qemu.org/, Aug. 11, 2021, 2 pages.
Hildenbrand et al. "Virtio-(balloon|pmem|mem): Managing Guest Memory", KVM Forum, 2020, 21 pages.
No Author. "Base Specification", NVM express, May 13, 2021, 452 pages.
Tian et al. "coIOMMU: A Virtual IOMMU with Cooperative DMA Buffer Tracking for Efficient Memory Management in Direct I/", Usenix—The advanced computing systems association, Jul. 15-17, 2020, 15 pages.
Wunner Lukas. "The modernization of PCIe hotplug in Linux", retrieved from web https://lwn.net/Articles/767885/, Oct. 8, 2018, 6 pages.
Xu et al. "SRVM: Hypervisor Support for Live Migration with Passthrough SR-IOV Network Devices" Acm Sigplan Notices, pp. 65-77, vol. 51, Issue 7.
Zheng et al. "Live Migration Support for GPU with SR-IOV", retrieved from web https://events19.linuxfoundation.org/wp-content/uploads/2017/12/Live-Migration-Support-for-GPU-with-SRIOV-Challenges-and-Solution-Zheng-Xiao-Alibaba-Cloud-Jerry-Jiang-Ken-Xue-AMD.pdf, 2017, 19 pages.

* cited by examiner

LIVE MIGRATION BETWEEN HOSTS OF A VIRTUAL MACHINE CONNECTION TO A HOST INTERFACE

BACKGROUND OF THE INVENTION

The present invention relates generally to data processing and, in particular, to live migration, between hosts, of a virtual machine connection to a host interface.

In general, cloud computing refers to a computational model in which data processing, data storage, and network resources, software, and data are accessible to client computer systems, where the details of the underlying information technology (IT) infrastructure providing such resources is transparent to consumers of cloud services. In various implementations, the IT infrastructure can be on-premises or off-premises (or a hybrid of the two) with respect to the client computer systems of the cloud consumers. Further, the cloud computing resources can be (but are not required to be) widely geographically and/or topologically distributed.

Cloud computing is facilitated by ease-of-access to remote computing websites (e.g., via the Internet or a private corporate network) and frequently takes the form of web-based resources, tools, or applications that a cloud consumer can access and use through a web browser, as if the resources, tools or applications were a local program installed on a client computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of cloud computing has been facilitated by the widespread utilization of virtualization, which is the creation of virtual (rather than actual) instances of computing resources, e.g., an operating system, a server, a storage device, network resources, etc. For example, a virtual machine (VM), also referred to as a logical partition (LPAR), is a software implementation of a physical machine (e.g., a computer system or "host") that executes instructions like a physical machine. VMs can be categorized as system VMs (also referred to as virtual server instances (VSIs)) or process VMs. A system VM provides a complete system platform that supports the execution of a complete operating system (OS), such as Windows, Linux, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different cloud computing customers. The virtualization of actual IT resources and management of VMs is typically provided by software referred to as a VM monitor (VMM) or hypervisor.

In a typical virtualized computing environment, VMs and VMMs can communicate with each other and with physical entities in the IT infrastructure of the computing environment utilizing conventional input/output (I/O) and networking protocols. As is known in the art, conventional networking protocols are commonly premised on the well-known seven layer Open Systems Interconnection (OSI) model, which includes (in ascending order) physical, data link, network, transport, session, presentation and application layers. In some implementations, VMs and VMMs are enabled to communicate with I/O devices (including physical I/O devices) through the instantiation of corresponding virtual I/O devices.

In a cloud computing environment as described, a cloud provider may migrate a VM from a source host to a destination host in the cloud computing environment, for example, in order to perform system maintenance and/or upgrades, to facilitate load balancing, or to meet dynamic resource requirements, among other reasons. While existing VM migration techniques facilitate the communication of the state and data set of the VM between hosts, existing VM migration techniques generally do not support live migration, between hosts, of the configuration of a connection between the VM and a physical host interface, such as a network interface card (NIC) or other I/O controller, particularly without explicit hardware support.

BRIEF SUMMARY

The various embodiments of the present invention provide support for live migration, between hosts, of a connection between a virtual machine (VM) and a host interface.

In at least one embodiment, live migration of a VM includes establishing multipath connections between the VM and functions of host interface on a source host. The multipath connections include a passthrough path and a software-virtualized (or emulated) path provided by a hypervisor of the source host. A failover of the passthrough path to the emulated path is executed, and a state of the emulated path is thereafter saved. On a host interface of a destination host, functions corresponding to those of the source host are exposed. The VM is then migrated from the source host to the destination host. The VM resumes host interface communication with the host interface of the destination host from the saved state via an emulated path provided by a hypervisor of the destination host. After resuming communication, a passthrough path of communication between the VM and the host interface of the destination host is established.

In at least some embodiments, the live migration of the VM is performed transparently, without requiring participation of, or coordination with, a cloud consumer associated with the migrated VM.

Aspects of the invention can be implemented as a method, a data processing system, and a program product.

DETAILED DESCRIPTION

Figure 1:
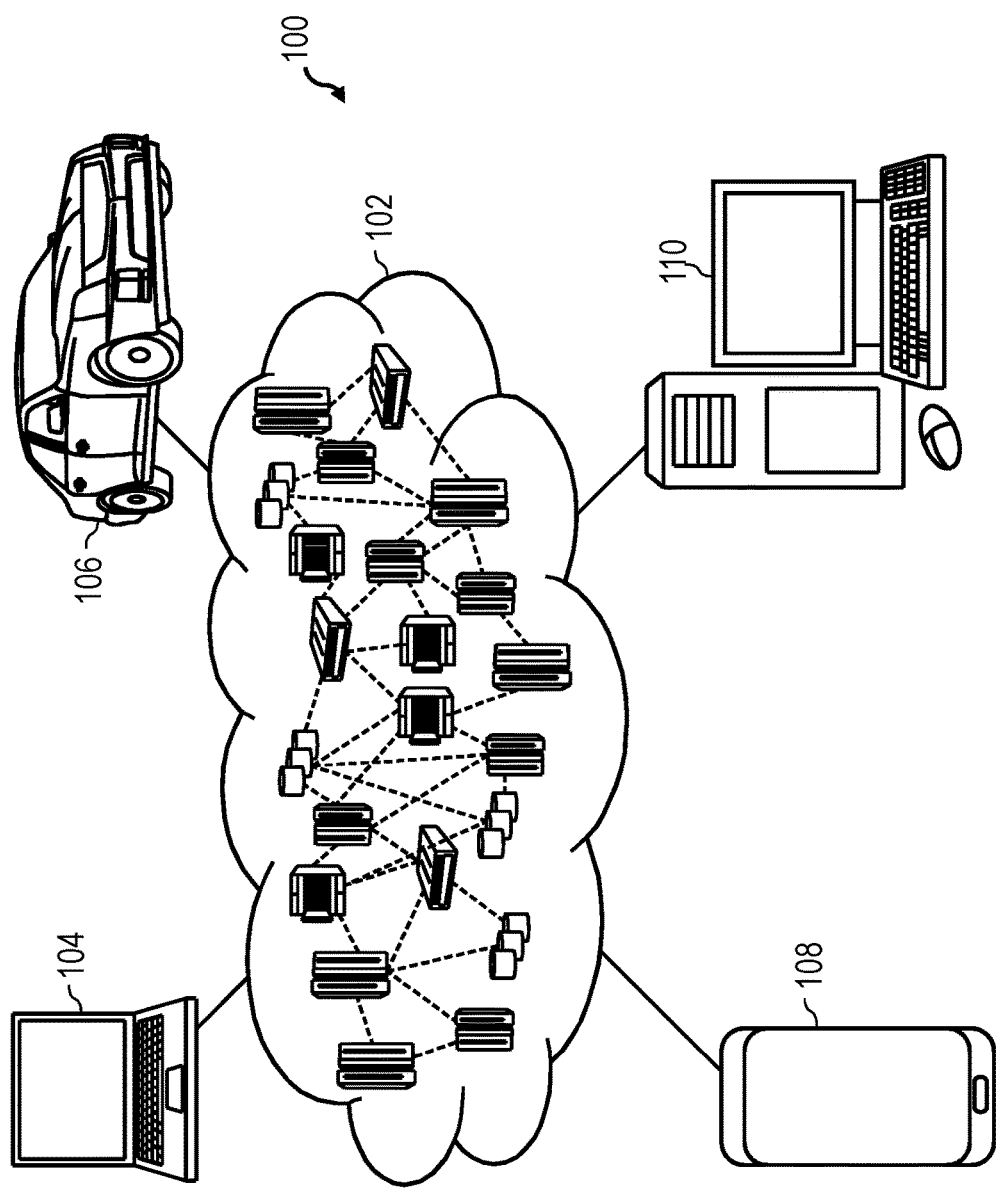
FIG. 1 is a high-level block diagram of an exemplary cloud computing environment in accordance with one embodiment.

With reference now to the figures, in which like reference numerals refer to like and corresponding parts throughout, and in particular with reference to FIG. 1, there is illustrated a cloud computing environment 100. As shown, cloud computing environment 100 includes one or more cloud computing nodes (illustrated generally within cloud 102) with which client devices used by cloud consumers may communicate to access cloud services. These client devices may include, for example, laptop or tablet computers 104, embedded systems such automotive computer systems 106, mobile telephones 108, and/or desktop computers 110. Cloud computing nodes within cloud 102 may be grouped (not shown) physically or virtually, in one or more networks, such as a private cloud, community cloud, public cloud, hybrid cloud, or a combination thereof. Cloud 102 offers infrastructure, platforms, and/or software as services for which a cloud consumer does not need to maintain resources on the cloud consumer's client device(s). It is understood that the types of client devices 104-110 shown in FIG. 1 are merely illustrative and that client devices of various types can communicate with the nodes of cloud 102 and receive cloud services over any type of network and/or network addressable connection (e.g., using a web browser).

Figure 2:
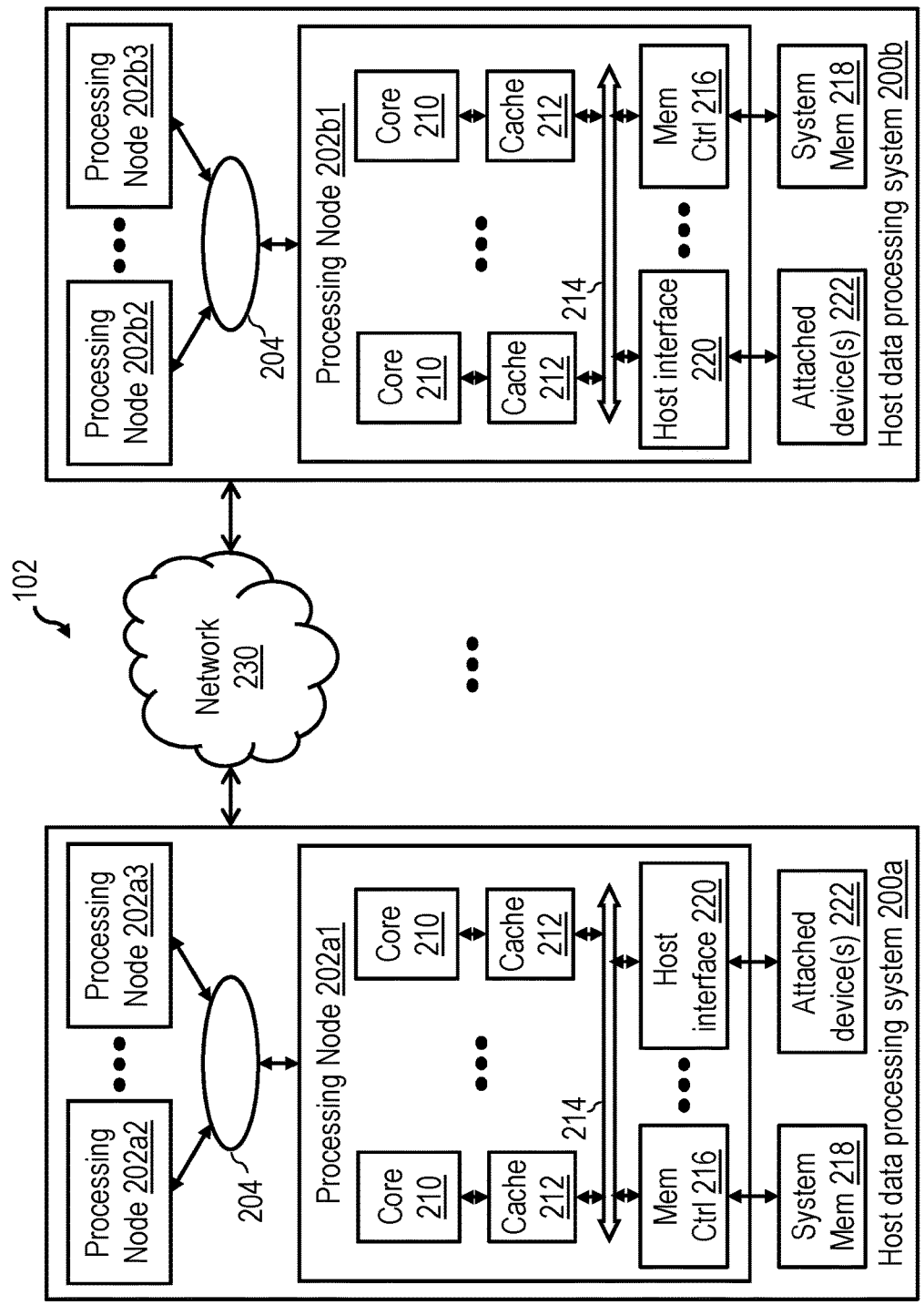
FIG. 2 is a high-level block diagram of a portion of the cloud of FIG. 1 in accordance with one embodiment.

With reference now to FIG. 2, there is illustrated a high-level block diagram of a portion of cloud 102 of FIG. 1 in accordance with one embodiment. The depicted portion of cloud 102 includes multiple host data processing systems, including, for example, host data processing systems 200a and 200b. Host data processing systems 200 are coupled for communication by a network 230 within cloud 102. In this example, each host data processing system 200 is a cache-coherent multiprocessor (MP) data processing system including multiple processing nodes 202 for processing data and instructions. For example, host data processing system 200a includes processing nodes 202a1-202a3, and host data processing system 200b includes processing nodes 202b1-202b3. The processing nodes 202 in each host data processing system 200 are coupled by a system interconnect 204 for conveying address, data and control information. System interconnects 204 may be implemented, for example, as a bused interconnect, a switched interconnect, or a hybrid interconnect.

In the depicted embodiment, each processing node 202 includes one or more processor cores 210, which are each supported by a respective cache hierarchy 212. The processing cores 210 within each processing node 202 are coupled for communication to each other and system interconnect 204 by a local interconnect 214, which, like system interconnect 204, may be implemented, for example, with one or more buses and/or switches. System interconnect 204 and local interconnect 214 together form a system fabric. In at least some preferred embodiments, communication on the system fabric is compliant with a so-called host bus protocol, which defines, inter alia, predetermined sets of legal requests, responses, and control information communicated between communication participants (e.g., caches, memory controllers, etc.) via the system fabric.

In at least some embodiments, one or more of processing nodes 202 (and possibly all of processing nodes 202) include a memory controller 216 coupled to local interconnect 214 to provide an interface to a respective system memory 218. Data and instructions residing in system memories 218 can generally be accessed, cached and modified by a processor core 210 in any processing node 202 of the same host data processing system 200. In alternative embodiments, one or more memory controllers 216 (and system memories 218) can be directly coupled or indirectly coupled (e.g., via a switch) to system interconnect 204 rather than a local interconnect 214.

In at least some embodiments, one or more of processing nodes 202 can also include a host interface 220 for connecting the processing node 202 to one or more additional attached devices 222. In some embodiments, a host interface 220 may be a network interface controller (NIC). In other embodiments, a host interface 220 may be a storage controller, such as a Non-Volatile Memory Express (NVMe) controller, which implements the Non-Volatile Memory Host Controller Interface Specification (NVMHCIS) to interface with one or more attached devices 222 (e.g., solid-state disks (SSDs)). In some embodiments, communication between a host interface 220 and attached device(s) 222 may employ, for example, the Peripheral Component Interface Express (PCIe) bus standard.

Those skilled in the art will appreciate that host data processing systems 200 of FIG. 2 can include many additional non-illustrated components, such as interconnect bridges, non-volatile storage, ports for connection to networks or attached devices, etc. Because such additional components are not necessary for an understanding of the described embodiments, they are not illustrated in FIG. 2 or discussed further herein. It should also be understood, however, that the enhancements described herein are applicable to host data processing systems of diverse architectures and are in no way limited to the generalized data processing system architecture illustrated in FIG. 2.

Figure 3:
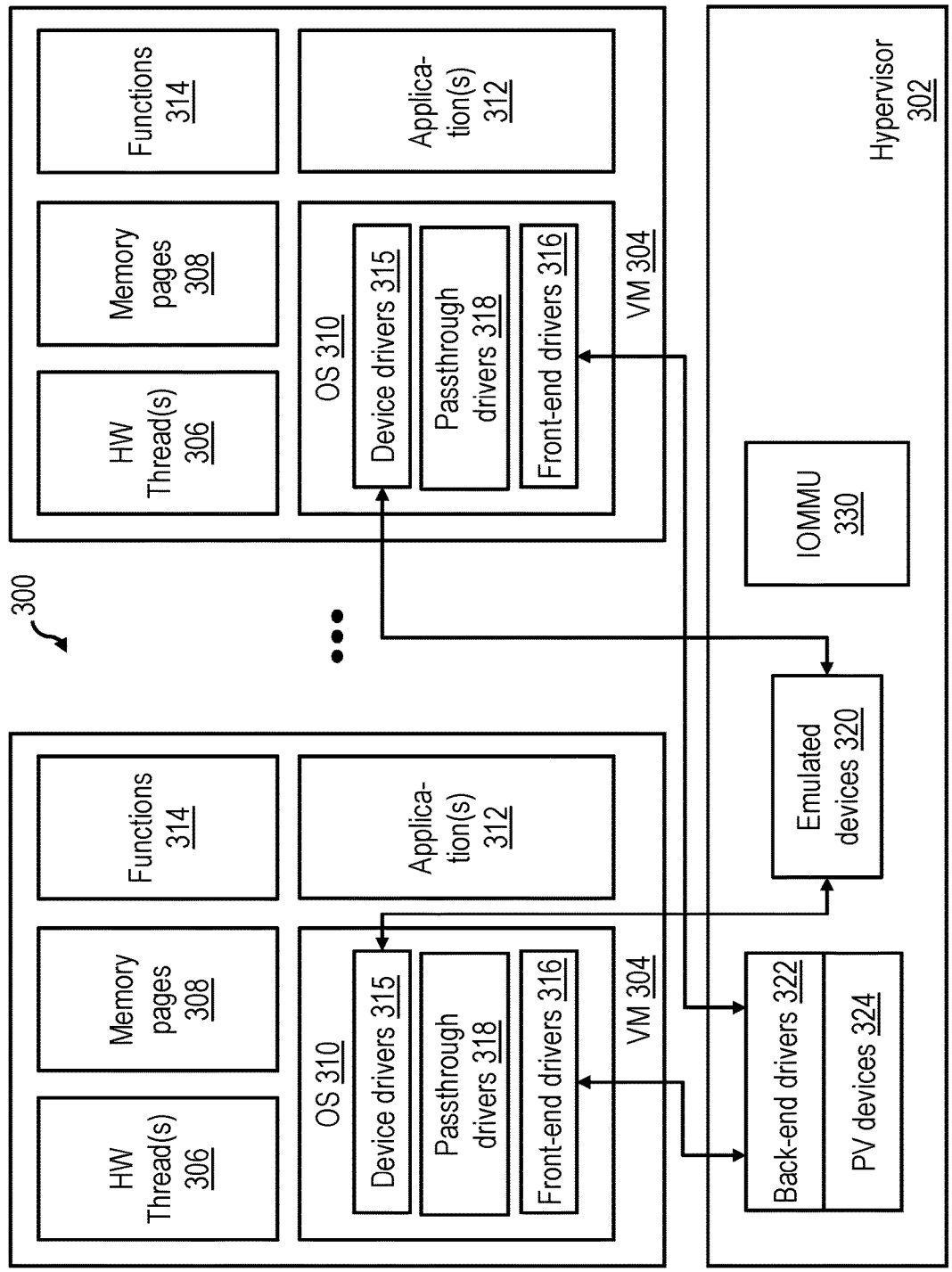
FIG. 3 is a logical view of a hypervisor and logical partitions of an exemplary host data processing system in accordance with one embodiment.

With reference now to FIG. 3, there is depicted a logical view of the software configuration 300 of a host data processing system 200 of FIG. 2 in accordance with one embodiment. In this example, software configuration 300 of each host data processing system 200 includes a hypervisor (or VMM) 302 that manages the hardware and software resources of the host data processing system 200. Hypervisor 302 virtualizes many of the underlying resources of host data processing system 200 through the implementation of one or more virtual machines (VMs) 304 (also referred to as logical partitions (LPARs)). In this example, each VM 304 includes a specified number of hardware threads 306 within one or more processor cores 200 of the host 100, a collection of memory pages 308 at specified real addresses (RAs) for storing the dataset of the VM 304, an instance of an operating system 310 (e.g., Linux®, Windows®, Android®, iOS®, etc.), and a collection of application(s) 312 executing on the OS 310. In a cloud computing environment 100, the VMs 304 running on a given host data processing system 200 may belong to multiple different cloud consumers, and OSs 310 can be referred to as "guest OSs." A VM 304 additionally includes one or more functions 314 (e.g., virtual functions (VFs) and/or physical functions (PFs)) that represent allocable subsets of the functionality of devices, such as host interfaces 220.

Hypervisor 302 of host data processing system 200 can present system resources that the various VMs 304 can access (e.g., disks, network adapters, and other platform elements) in a variety of different ways, including as fully virtualized devices, paravirtualized devices, and pass-through devices. In embodiments in which hypervisor 302 presents system resources to VMs 304 utilizing full virtualization, a virtualized physical device can be transparently presented to VMs 304 as fully virtualized emulated device 320. VMs 304 can access an emulated device 320 just like a physical device utilizing the same standard device driver 315 that would be utilized to access the physical device. In embodiments in which the host data processing system 200 implements paravirtualization of hardware devices, OS 310 implements one or more front-end drivers 316 to support access to functions 314 via commands issued to corresponding back-end drivers 322 provided by hypervisor 302. Back-end drivers 322, in turn, access paravirtualized (PV) devices 324 provided by hypervisor 302 that are emulations of the underlying hardware devices. OS 310 can also implement passthrough (or "physical") drivers 318 that support "pass-through" communication via hypervisor 302 (e.g., utilizing the PCIe standard) between the passthrough drivers 318 and functions 314 without an intervening emulated device 320 or paravirtualized device 324.

Hypervisor 302 also manages an I/O memory management unit 320. IOMMU 330, which can be physically implemented in hardware or virtualized (i.e., implemented in system memory 218), is an address translation facility that provides translations between I/O virtual addresses (IOVAs) employed by attached device(s) 222 coupled to host interface 220 and real addresses (RAs) utilized to address storage locations in system memory 218. The IOVA-to-RA translation provided by IOMMU 330 can be utilized to support direct memory accesses (DMAs) by attached devices 222.

As discussed above, hypervisor 302 may determine that it is desirable or required to perform a live migration of a workload, for example, one of VMs 304, from its own host data processing system 200 to another host data processing system 200 in cloud 102 for any of a variety of reasons. In accordance with the embodiments described herein, the migration preferably copies the dataset and state of the migrating VM 304 from the host data processing system 200 on which the VM 404 was initially executing (referred to herein as the "source host") to another host data processing system 200 on which the VM 404 continues its execution (referred to herein as the "destination host"). It is desirable to be able to perform such a migration as a "live" migration, such that the migration is performed memory-to-memory, and as a "transparent" migration, meaning that the migration is performed without requiring participation of, or coordination with, the cloud consumer associated with the migrated VM 304.

Figure 4:
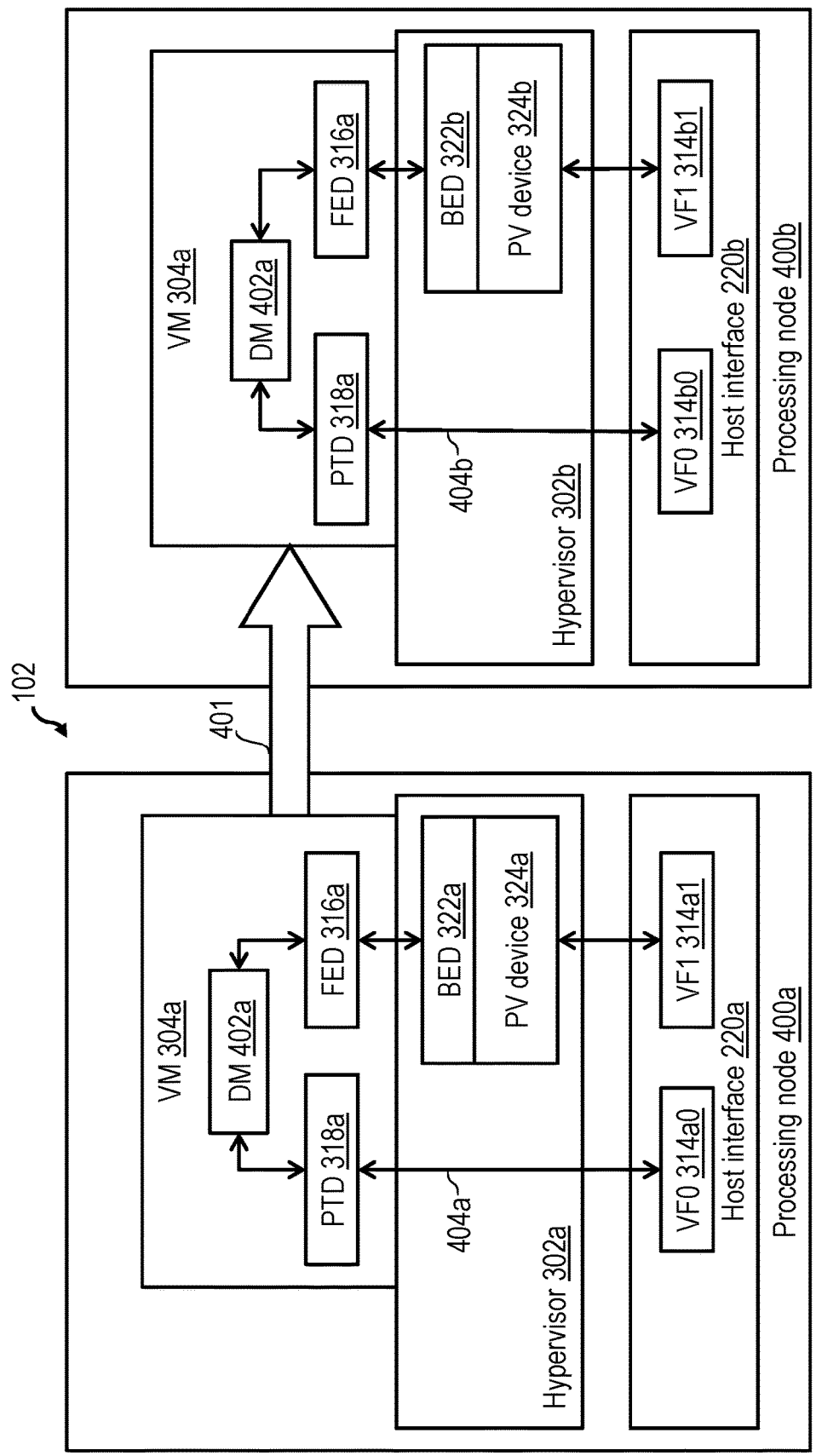
FIG. 4 is a high-level block diagram illustrating live migration, between hosts, of a virtual machine connection to a host interface in accordance with a first embodiment.

Referring now to FIG. 4, there is illustrated a high-level block diagram of the live migration, between hosts, of a virtual machine connection to a host interface in accordance with a first embodiment implementing paravirtualization of the host interface. For ease of understanding, this first embodiment is described with additional reference to the high-level logical flowchart given in FIG. 5.

FIG. 4 depicts a portion of a cloud 102 including processing nodes 400a and 400b, which can be, for example, one of processing nodes 202a1-202a3 and one of processing nodes 202b1-202b3, respectively. Processing node 400a includes one or more VMs 304, including a VM 304a that is to be live-migrated from processing node 400a to processing node 400b, as indicated by arrow 401. In some embodiments or use cases, VM 304a can be a virtual server instance (VSI); in other embodiments, VM 304a can be a different type of virtual machine (VM). Although not explicitly shown in FIG. 4, VM 304a includes an OS 310 (e.g., Linux) providing software support for multipathing, as represented by device mapper (DM) function 402a. VM 304a also includes a passthrough driver (PTD) 318a and a front-end driver 316a. FIG. 4 additionally illustrates that processing node 400a further includes a hypervisor 302a and a host interface 220a, which includes a plurality of physical and/or virtual functions 314 that can be allocated to the VMs 304 of processing node 400a. In this example, the functions 314 of host interface 220a include virtual function 0 (VF0) 314a0 and virtual function 1 (VF1) 314a1 allocated to VM 304a.

Figure 5:
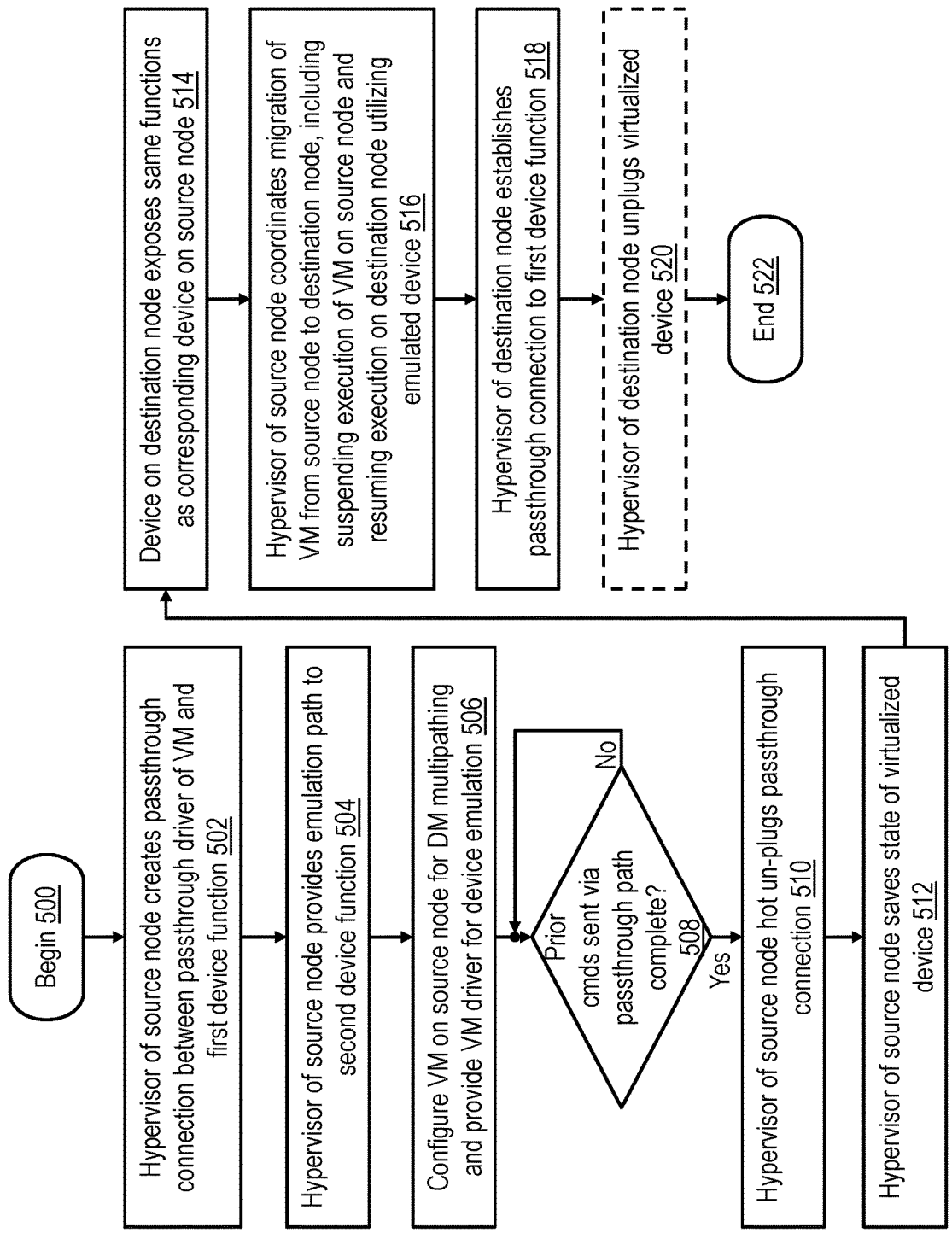
FIG. 5 is a high-level logical flowchart of an exemplary process of live migration of a virtual machine connection to a host interface in accordance with the first embodiment.

The live migration process depicted in FIG. 5 begins at block 500 and then proceeds to block 502, which illustrates hypervisor 302a creating a passthrough connection 404a between passthrough driver 318a of VM 304a and a first device function, such as VF0 314a0. As a result, PTD 318a can communicate commands (e.g., PCIe commands) to VF0 314a0 without involvement of an intermediate back-end driver 322 or PV device 324 provided by hypervisor 302a. As further illustrated at block 504, hypervisor 302a also establishes a software-virtualized (or emulation) path providing a connection between a suitable driver in VM 304a (e.g., front-end driver (FED) 316a) and a second device function (e.g., VF1 314a1) of host interface 220a (block 504). In at least some embodiments, front-end driver 316a can be, for example, a virtio-blk driver for a block storage device. In the paravirtualized embodiment depicted in FIG. 4, the emulation path established at block 504 includes back-end driver (BED) 322a and PV device 324a. Following block 504, the cloud consumer subsequently configures DM function 402a for DM-multipathing by establishing a failover relationship between the passthrough path and the emulation path (block 506). It should be appreciated that although multipath support is described herein utilizing Linux-specific terminology, those skilled in the art will appreciate that other VM OSs (e.g., Windows, AIX, etc.) provide similar multipathing support.

Following the establishment of the DM-multipath connections of VM 304a, a failover of the connection via passthrough path 404a to the connection via emulated device 324a is initiated. To initiate the failover, the cloud provider can either remotely configure the OS 310 of VM 304a (if this capability is supported) or the cloud provider can notify the cloud consumer to instead execute the failover. To accomplish this failover, hypervisor 302a first determines at block 508 whether or not all prior commands (e.g., block read commands, block write commands, etc.) sent by VM 304a to VF0 314a0 via passthrough path 404a have been completed. For example, at block 508 hypervisor 302a may verify that all relevant request queues associated with passthrough connection 404a are empty. Alternatively or additionally, the cloud consumer (or OS 310) may provide this notification to hypervisor 302. In response to a determination at block 508 that all prior commands sent by VM 304a to VF0 314a0 via passthrough path 404a have not been completed, the process iterates at block 508 until hypervisor 302a verifies that all prior commands sent by VM 304a to VF0 314a0 via passthrough path 404a have completed. In response to an affirmative determination at block 508, hypervisor 302a hot un-plugs passthrough connection 404a (block 510). In addition, hypervisor 302a saves the state of PV device 324a (block 512).

Hypervisor 302a of processing node 400a also coordinates with hypervisor 302b of processing node 400b to cause host interface 220b of processing node 400b to expose functions VF0 314b0 and VF1 314b1 that correspond respectively to functions VF0 314a0 and VF1 314a1 on host interface 220a of processing node 400a (block 514). Hypervisor 302a of processing node 400a then coordinates migration of VM 304a from processing node 400a to processing node 400b (block 516). As indicated, this migration includes, among other things, suspending execution of the VM 304a on processing node 400a, transferring the state of VM 304a from processing node 400a to processing node 400b, and resuming execution of VM 304a on processing node 400b. As execution of VM 304a is resumed on processing node 400b, any commands issued by DM 402a of VM 304a to host interface 220b are communicating utilizing the emulated path including front-end driver (FED) 316a, a back-end driver (BED) 316b and emulated device 324b provided by hypervisor 302b, and VF1 314b1 of host interface 220b.

Following resumption of execution of VM 304a on processing node 400b, hypervisor 302b of processing node 400b establishes a passthrough connection 404b between passthrough driver (PTD) 318a and VF0 314b0 of host interface 220b, for example, by hot-plugging VF 314b0 in accordance with the PCIe protocol (block 518). If desired, hypervisor 302b of processing node 400b may thereafter optionally unplug PV device 324b, thus terminating the emulated path between VM 304a and host interface 220b (block 520). Following either block 518 or, if implemented, optional block 520, the process of FIG. 5 ends at block 522.

Depending on the implementation environment, the technique of live migration depicted in FIGS. 4-5 can be subject to some limitations. For example, in at least some cases, only connections to block devices configured for DM-multipathing can be migrated. This can be a significant limitation in that, in practice, a VM root block device is rarely configured for DM-multipathing. In addition, the live migration is not transparent for the migrated VM because the cloud consumer associated with the VM must configure the multipath device (e.g., DM 402a) for failover. These limitations can be addressed in a second embodiment of a technique of live migration described below with reference to FIGS. 6-10.

Figure 6:
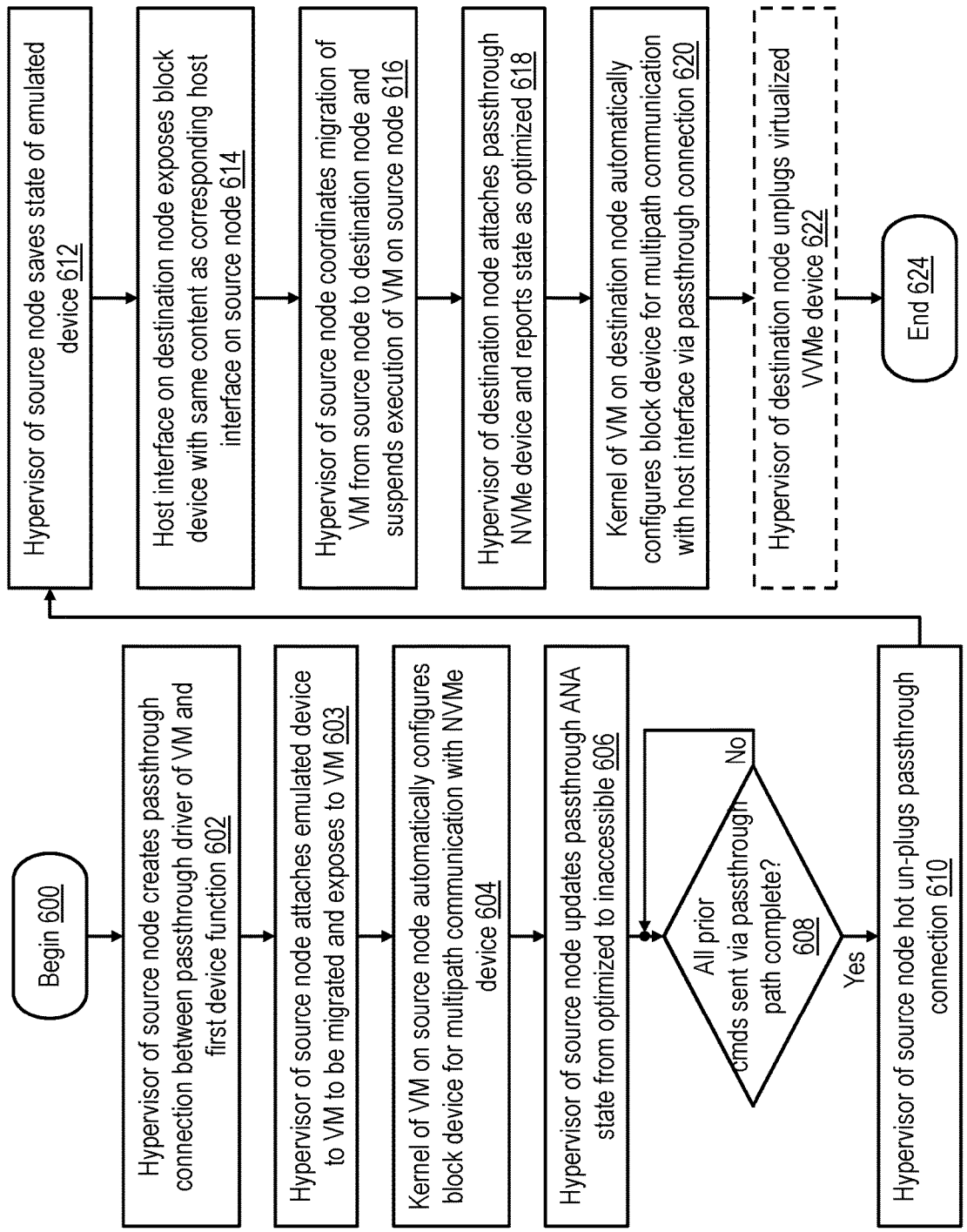
FIG. 6 is a high-level logical flowchart of an exemplary process of live migration of a virtual machine connection to a host interface in accordance with a second embodiment.

Referring now to FIG. 6, there is depicted a high-level logical flowchart of an exemplary process of live migration of a virtual machine connection to a host interface in accordance with a second embodiment implementing full virtualization of the host interface. For ease of understanding, this second embodiment is described with additional reference to the high-level block diagrams of a portion of a cloud 102 given in FIGS. 7-10.

Figure 7:
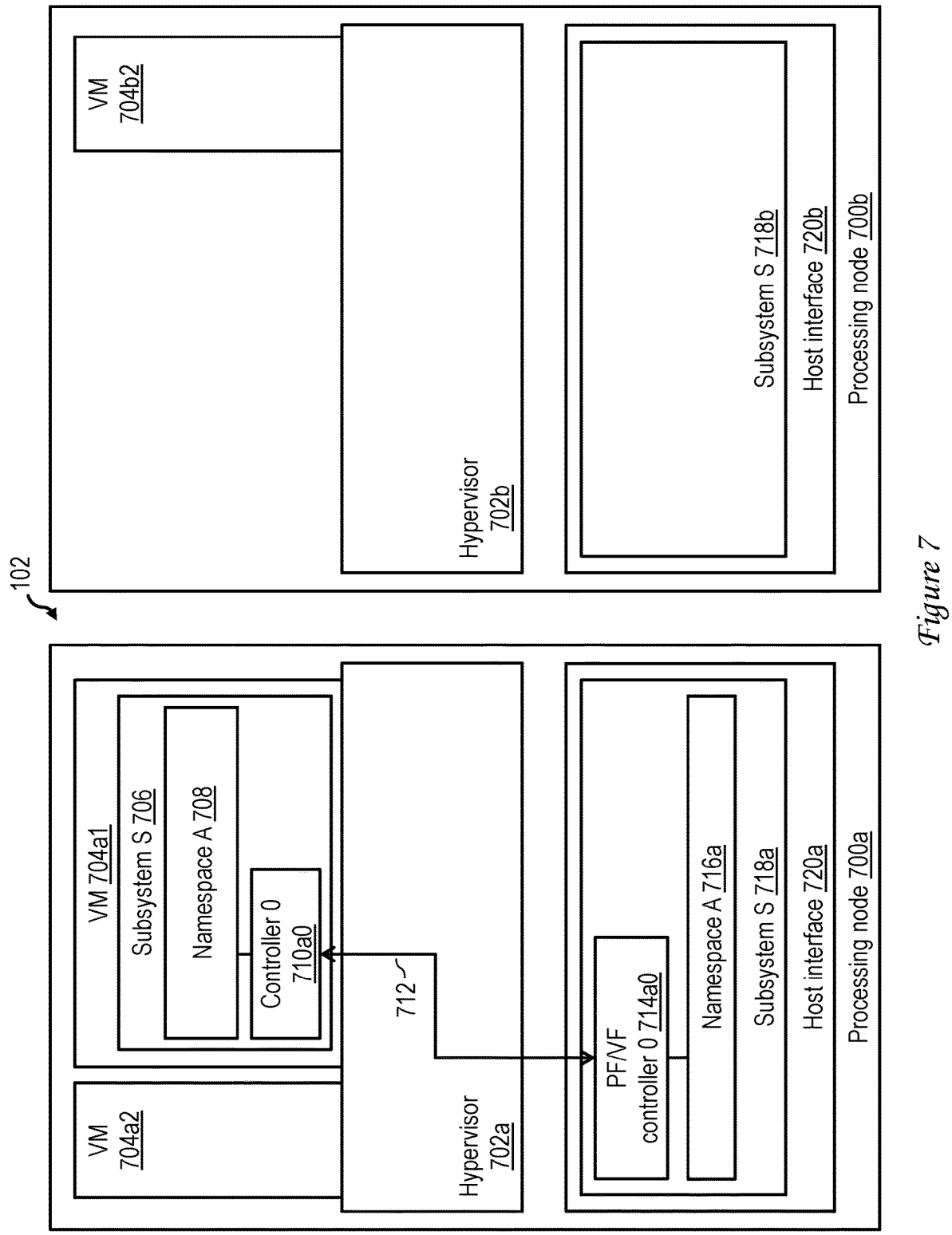
FIGS. 7-10 are high-level block diagrams depicting live migration, between hosts, of a virtual machine connection to a host interface in accordance with the second embodiment.

As shown in FIG. 7, the illustrated portion of cloud 102 includes processing nodes 700a and 700b, which can be, for example, one of processing nodes 202a1-202a3 and one of processing nodes 202b1-202b3, respectively. Each of processing nodes 700a, 700b may include one or more VMs 704. For example, processing node 700b includes a VM 704b2, and processing node includes VM 704a2 and a VM 704a1, which will be live-migrated from processing node 700a to processing node 700b in accordance with the process illustrated in FIG. 6. In at least some embodiments or use cases, VM 704a1 can be a virtual server instance (VSI); in other embodiments, VM 704a can be a different type of VM. VM 704a comprises an OS 310 that includes a subsystem S 706 having a namespace A 708 (e.g., for a storage volume) accessed via a controller 0 710a0. In at least some embodiments, the OS 310 of VM 704ba1 supports hot-plugging and hot-unplugging of devices, as well as at least some features of the NVMe specification, such as NVMe multipathing, Asymmetric Namespace Access (ANA) reporting, and asynchronous event reporting (e.g., an ANA change). In such embodiments, the OS 310 of VM 704a1 can be, for example, an instance of Linux, Windows, etc.

The process of FIG. 6 begins at block 600 and then proceeds to block 602, which illustrates hypervisor 702a creating a passthrough connection 712 between controller 0 710a0 318a of VM 704a1 and a first virtual or physical device function 314 of a host interface 720a of processing node 700a. In at least some embodiments, host interface 720a can be a NVMe device. In the depicted example, the device function 314 is exposed by a subsystem S 718a via a PF/VF controller 0 714a0 associated with namespace A 716 implemented by subsystem S 718a. As a result, VM 704a1 can communicate commands (e.g., PCIe commands) to subsystem S 718a of host interface 720a without involvement of an intermediate emulated device provided by hypervisor 702a.

Figure 8:
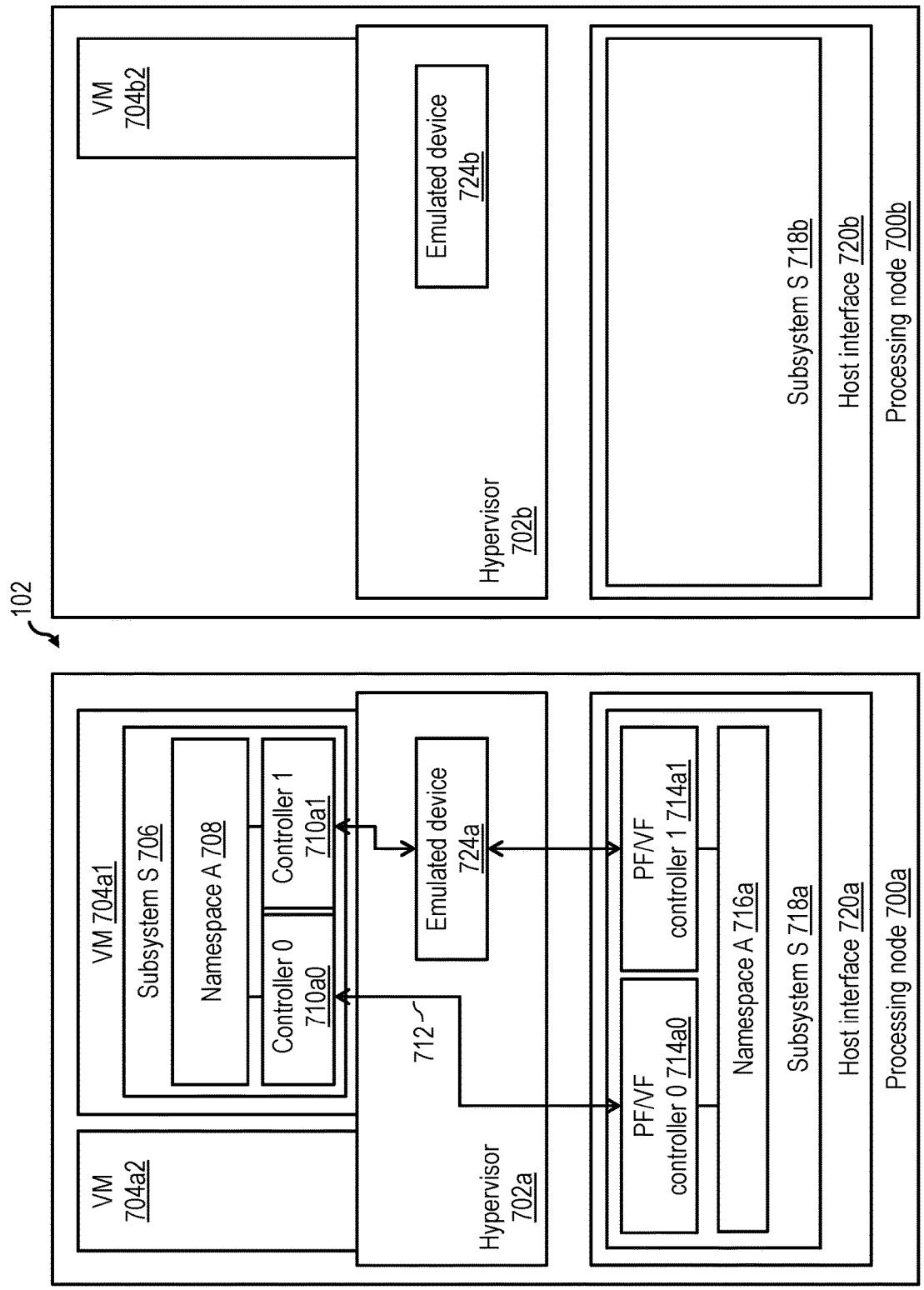

The process of FIG. 6 proceeds from block 602 to block 603, which illustrates hypervisor 702a of processing node 700a attaching an emulated device 724a to VM 704a1 and exposing emulated device 724a to VM 704a1. Emulated device 724a is a virtualized representation of a physical or virtual function 314 of subsystem S of host interface 720a, which has a Namespace A 716a accessible via a PF/VF controller 1 714a1. As depicted at block 604, based on the availability of the additional connection to host interface 720a via emulated device 724a, the kernel of OS 310 of VM 704a1 automatically configures Subsystem S 706 for multipath communication with host interface 720a. For example, in embodiments in which the OS 310 of VM 704a1 implements the NVMe specification, OS 310 automatically configures a block device for NVMe multipathing if the NVMe Qualified Name (NQN) and namespace identifier (e.g., Namespace ID (NSID), Namespace Globally Unique Identifier (NGUID), Universally Unique Identifier (UUID), or EUI64) of two different controllers of a given subsystem (e.g., controller 0 710a0 and controller 1 710a1 of subsystem S 706) match. Initially, the emulation path through emulated device 724a is configured to have the ANA state "non-optimized" and the passthrough path is configured to have the ANA state "optimized" such that the OS 310 prefers to route I/O traffic to host interface 720a via the passthrough path. The availability of both communication paths between VM 704a1 and host interface 720a is illustrated in FIG. 8. Thus, unlike the first embodiment of the live migration process depicted in FIG. 5, the second embodiment of the live migration process given in FIG. 6 is transparent to the cloud consumer and advantageously eliminates the requirement for cloud consumer configuration of the migrated VM for multipath/failover.

Following block 604, hypervisor 702a of processing node 700a (i.e., the source node from which VM 704a1 is to be live-migrated) updates the ANA state of passthrough connection 712 from "optimized" to "inaccessible" (block 606). Based on this ANA state change, OS 310 of VM 704a1 automatically reconfigures its I/O traffic to be communicated to host interface 720a only via emulated device 724a rather than through passthrough path 712 (block 608).

Figure 9:
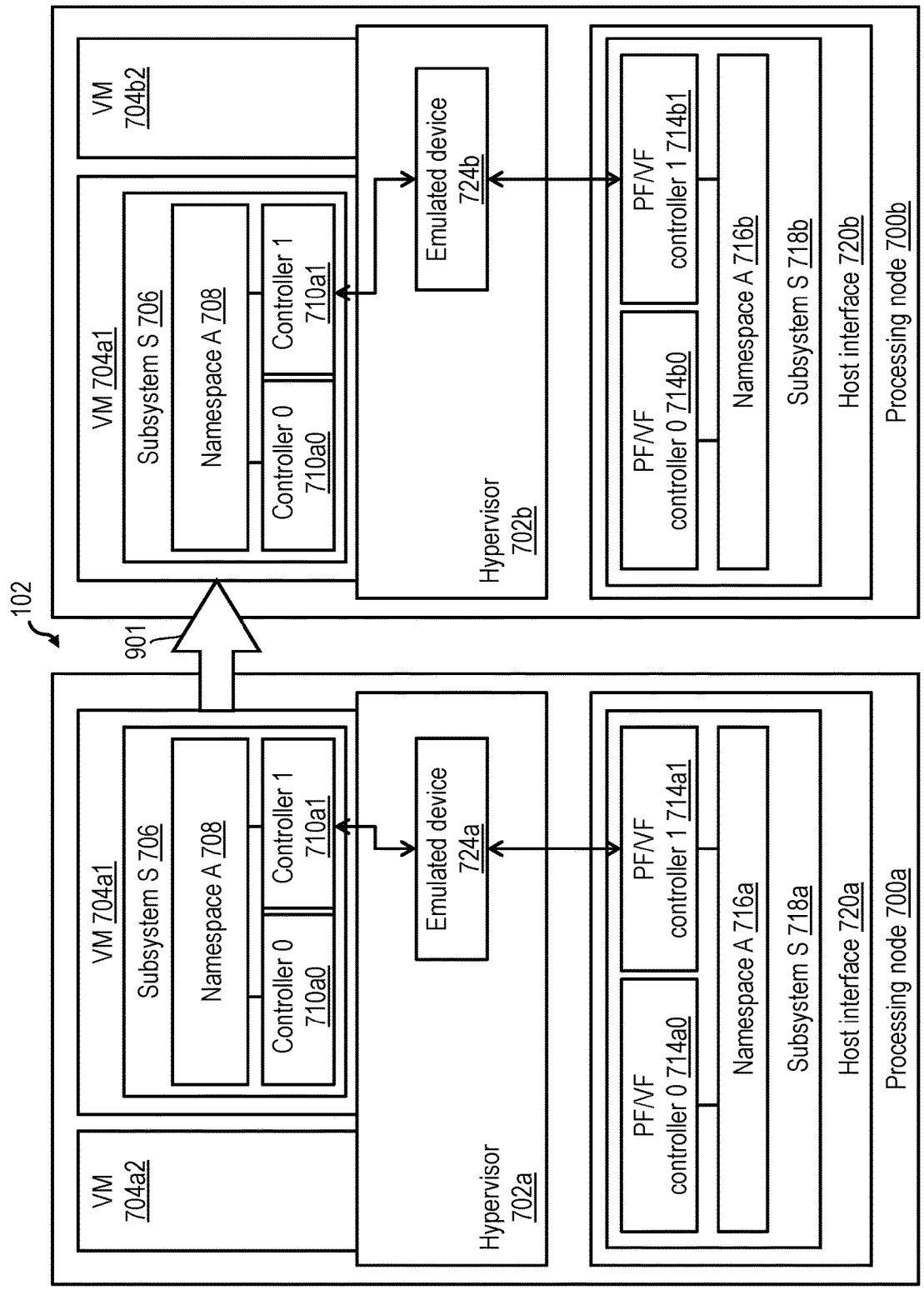

Following block 606, hypervisor 302a determines at block 608 whether or not all prior commands (e.g., block read commands, block write commands, etc.) sent by VM 704a1 to host interface 720a via passthrough path 712 have been completed. For example, at block 608 hypervisor 704a1 may verify that all relevant request queues associated with passthrough connection 712 are empty. If not, the process iterates at block 608 until hypervisor 702a verifies that all prior commands sent by VM 704a1 to host interface 720a via passthrough path 712 have completed. In response to an affirmative determination at block 608, hypervisor 302a hot un-plugs passthrough connection 712 (block 610), as represented in FIG. 9 by the absence of passthrough connection 712.

The process of FIG. 6 proceeds from block 610 to block 612, which illustrates hypervisor 702a saving the state of emulated device 724a. Hypervisor 702a of processing node 700a also coordinates with hypervisor 702b of processing node 700b to cause host interface 720b of processing node 700b to expose functions 314 corresponding to the functions 314 on host interface 220a of processing node 400a (block 614). In the depicted example, the device functions 314 are exposed by a subsystem S 718b via PF/VF controller 0 714b0 and PF/VF controller 1 714b1 associated with namespace A 716b implemented by subsystem S 718b. Hypervisor 702a then coordinates migration of VM 704a1 from processing node 700a to processing node 700b of processing node 700b, as indicated generally in FIG. 9 by arrow 901. This migration includes, among other things, suspending execution of the VM 704a1 on processing node 700a, transferring the state of VM 704a1 from processing node 700a to processing node 700b, and resuming execution of VM 704a1 on processing node 700b. As execution of VM 704a1 is resumed on processing node 700b, any commands issued by VM 704a1 to host interface 720b utilize the emulated path via emulated device 724b of hypervisor 702b, as depicted in FIG. 9.

Figure 10:
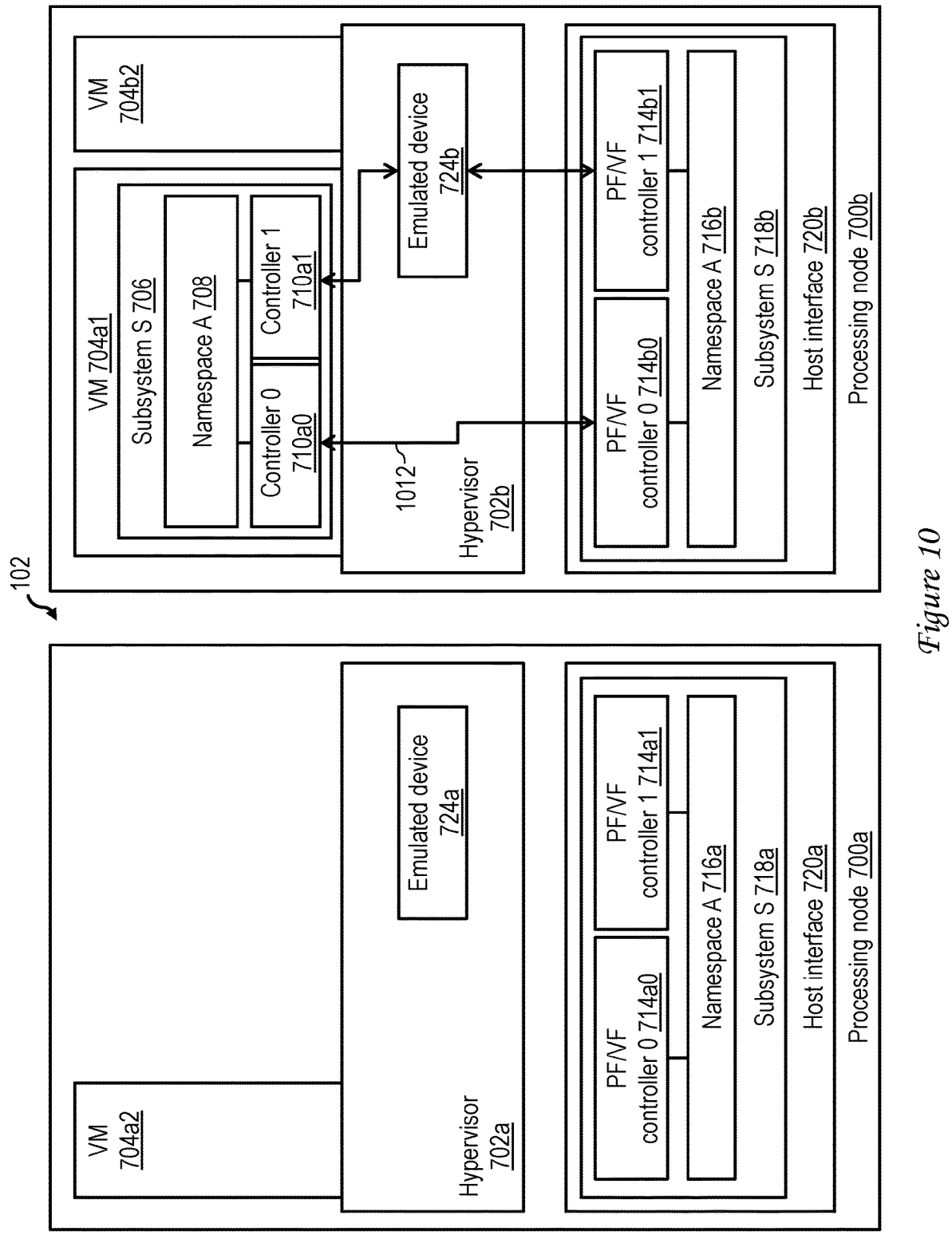

Following resumption of execution of VM 704a1 on processing node 700b, hypervisor 702b of processing node 700b establishes a passthrough connection 1012 between controller 0 710a0 of VM 704a1 and PF/VF controller 0 714b0 of host interface 720b and reports the ANA state as "optimized" (block 618). This passthrough connection 1012 is illustrated in FIG. 10. As depicted at block 620, based on the ANA state change, the kernel of OS 310 of VM 704a1 automatically configures subsystem S 706 for multipath communication with host interface 720b via passthrough connection 1012. If desired, hypervisor 702b of processing node 700b may thereafter optionally unplug emulated device 724b, thus terminating the emulated path between VM 704a1 and host interface 220b (block 622). Following either block 620 or, if implemented, optional block 622, the process of FIG. 6 ends at block 624.

As has been described, live migration of a VM includes establishing multipath connections between the VM and functions of host interface on a source host. The multipath connections include a passthrough path and a software-virtualized (or emulated) path provided by a hypervisor of the source host. A failover of the passthrough path to the emulated path is executed, and a state of the emulated path is thereafter saved. On a host interface of a destination host, functions corresponding to those of the source host are exposed. The VM is then migrated from the source host to the destination host. The VM resumes host interface communication with the host interface of the destination host from the saved state via an emulated path provided by a hypervisor of the destination host. After resuming communication, a passthrough path of communication between the VM and the host interface of the destination host is established. In at least some embodiments, the live migration is performed transparently, without requiring participation of, or coordination with, the cloud consumer associated with the migrated VM. It should be appreciated that although first and second embodiments have been respectively described in conjunction with the paravirtualization and full virtualization of a host interface, either embodiment can be utilized for either type of virtualization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data processing hardware that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of live migration of a virtual machine in a data processing environment including a source host and a destination host, the method comprising:

establishing multipath connections between the virtual machine on the source host and a first function and a second function of a first host interface of the source host, the multipath connections including a passthrough path and an emulated path provided by a hypervisor of the source host;

executing, on the source host, a failover of the passthrough path to the emulated path, wherein the executing of the failover includes:

determining that all commands from the virtual machine to the first function of the first host interface, communicated via the passthrough path are completed; and executing a hot un-plug of the passthrough path on the source host based on the determining that all the commands from the virtual machine to the first function communicated via the passthrough path are completed;

saving, based on the executing of the failover, a state of the emulated path;

exposing, on a second host interface of the destination host, a first function and a second function corresponding to the first function and the second function of the first host interface of the source host;

migrating, based on the exposing, the virtual machine from the source host to the destination host;

resuming, on the destination host, communication of the virtual machine to the second function of the second host interface from the saved state of the emulated path of the source host, wherein
the communication is resumed via an emulated path provided by a hypervisor of the destination host; and
establishing, after the resuming of the communication, a passthrough path of communication between the virtual machine and the first function of the second host interface of the destination host.

2. The method of claim 1, wherein the establishing of the multipath connections between the virtual machine on the source host and the first function and the second function of the first host interface of the source host includes:
automatically establishing, by an operating system of the virtual machine, the multipath connections based on sharing of a shared storage volume by multiple controllers of the virtual machine.

3. The method of claim 1, further comprising:
un-plugging, after the establishing of the passthrough path of the communication between the virtual machine and the first function of the second host interface of the destination host, the emulated path on the destination host.

4. The method of claim 1, wherein the emulated path on the source host includes a back-end driver and a paravirtualized device.

5. The method of claim 1, wherein the first host interface comprises a Non-Volatile Memory Express (NMVe) controller.

6. The method of claim 1, wherein the passthrough path on the source host comprises a Peripheral Component Interconnect Express (PCIe) passthrough path.

7. A data processing system serving as a source host, the data processing system comprising:
a processor;
a first host interface coupled to the processor; and
a storage system coupled to the processor, wherein the storage system includes program code executable by the processor that causes the data processing system to:
establish multipath connections between a virtual machine on the source host and a first function and a second function of the first host interface of the source host, the multipath connections including a passthrough path and an emulated path provided by a hypervisor of the source host;
execute a failover of the passthrough path to the emulated path, wherein the execution of the failover includes:
determination that all commands from the virtual machine to the first function of the first host interface, communicated via the passthrough path are completed; and
execution of a hot un-plug of the passthrough path on the source host based on the determination that all the commands from the virtual machine to the first function communicated via the passthrough path are completed;
save, based on the execution of the failover, a state of the emulated path;
co-ordinate with a destination host to:
expose, on a second host interface of the destination host, a first function and a second function corresponding to the first function and the second function of the first host interface of the source host;

migrate, based on the exposure of the first function and the second function on the second host interface, the virtual machine from the source host to the destination host; and
resume, on the destination host, communication of the virtual machine to the second host interface from the saved state of the emulated path of the source host,
wherein the communication is resumed via an emulated path provided by a hypervisor of the destination host.

8. The data processing system of claim 7, wherein the establishment of the multipath connections between the virtual machine on the source host and the first function and the second function of the first host interface of the source host includes:
automatic establishment, by an operating system of the virtual machine, of the multipath connections based on multiple controllers of the virtual machine that share a shared storage volume.

9. The data processing system of claim 7, wherein the emulated path on the source host includes a back-end driver and a paravirtualized device.

10. The data processing system of claim 7, wherein the first host interface comprises a Non-Volatile Memory Express (NMVe) controller.

11. The data processing system of claim 7, wherein the passthrough path on the source host comprises a Peripheral Component Interconnect Express (PCIe) passthrough path.

12. The data processing system of claim 7, wherein the program code further causes the data processing system:
update, on the source host, a state of the passthrough path to inaccessible, and wherein the state of the passthrough path on the source host is updated to inaccessible prior to the execution of the failover on the source host.

13. A program product, comprising:
a storage device; and
program code, stored within the storage device, which when executed by a processor of a data processing system serving a source host causes the data processing system to perform:
establishing multipath connections between a virtual machine on the source host and a first function and a second function of a first host interface of the source host, the multipath connections including a passthrough path and an emulated path provided by a hypervisor of the source host;
executing a failover of the passthrough path to the emulated path, wherein the executing of the failover includes:
determining that all commands from the virtual machine to the first function of the first host interface, communicated via the passthrough path are completed; and
executing a hot un-plug of the passthrough path on the source host based on the determining that all the commands from the virtual machine to the first function communicated via the passthrough path are completed;
saving, based on the executing of the failover, a state of the emulated path;
coordinating with a destination host to;
expose, on a second host interface of the destination host, a first function and a second function corresponding to the first function and second function of the first host interface of the source host;

migrate, based on the expose of the first function and the second function on the second host interface, the virtual machine from the source host to the destination host; and resume, on the destination host, communication, of the virtual machine to the second host interface from the saved state of the emulated path of the source host, wherein the communication is resumed via an emulated path provided by a hypervisor of the destination host.

14. The program product of claim 13, wherein the establishing of the multipath connections between the virtual machine on the source host and the first function and the second function of the first host interface of the source host includes:

automatically establishing, by an operating system of the virtual machine, the multipath connections based on sharing, of a shared storage volume by multiple controllers of the virtual machine.

15. The program product of claim 13, wherein the emulated path on the source host includes a back-end driver and a paravirtualized device.

16. The program product of claim 13, wherein the first host interface comprises a Non-Volatile Memory Express (NMVe) controller.

17. The program product of claim 13, wherein the passthrough path on the source host comprises a Peripheral Component Interconnect Express (PCIe) passthrough path.

* * * * *